US010412545B1

(12) United States Patent
Liu et al.

(10) Patent No.: US 10,412,545 B1
(45) Date of Patent: Sep. 10, 2019

(54) DEVICE-TO-DEVICE RADIO FREQUENCY PROXIMITY DETERMINATION

(71) Applicant: Marvell International Ltd., Hamilton (BM)

(72) Inventors: BoChih Liu, Pudong District (CN); Zhike Jia, Fremont, CA (US); Jing Yu, Shanghai (CN); Paul Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 25 days.

(21) Appl. No.: 15/791,517

(22) Filed: Oct. 24, 2017

Related U.S. Application Data

(60) Provisional application No. 62/411,896, filed on Oct. 24, 2016.

(51) Int. Cl.

| | |
|---|---|
| *H04W 4/02* | (2018.01) |
| *H04W 84/12* | (2009.01) |
| *G01S 5/02* | (2010.01) |
| *G01S 5/00* | (2006.01) |
| *H04W 8/00* | (2009.01) |

(52) U.S. Cl.
CPC .......... *H04W 4/023* (2013.01); *G01S 5/0072* (2013.01); *G01S 5/0289* (2013.01); *H04W 4/026* (2013.01); *H04W 8/005* (2013.01); *H04W 84/12* (2013.01)

(58) Field of Classification Search
CPC ..... H04W 4/023; H04W 4/026; H04W 8/005; H04W 84/12; G01S 5/0072; G01S 5/0289
See application file for complete search history.

(56) References Cited

U.S. PATENT DOCUMENTS

| | | | | |
|---|---|---|---|---|
| 8,634,848 | B1 * | 1/2014 | Bozarth | H04W 64/00 455/41.2 |
| 2004/0033808 | A1 * | 2/2004 | Rorabaugh | G01S 5/0289 455/456.1 |
| 2009/0264070 | A1 * | 10/2009 | Lim | G06Q 30/0261 455/41.2 |
| 2010/0087144 | A1 * | 4/2010 | Korenshtein | H04B 17/318 455/41.2 |
| 2010/0169817 | A1 * | 7/2010 | Want | G06F 3/04817 715/772 |
| 2011/0294474 | A1 * | 12/2011 | Barany | H04W 8/005 455/414.1 |

* cited by examiner

*Primary Examiner* — Dinh Nguyen

(57) ABSTRACT

The present disclosure describes techniques and apparatuses for device-to-device radio frequency proximity determination. These techniques, in contrast to conventional cellular and GPS services, can accurately locate mobile devices at relatively low cost. In some aspects, three or more mobile communication devices communicate radio frequency ranging signals and, using information about these signals, a distance and direction between two of the devices is determined. In some other aspects, two mobile communication devices communicate radio frequency ranging signals separated in time, and after movement of one of the mobile communication devices. Using information about these two signals, a distance and direction between the two devices is determined.

20 Claims, 7 Drawing Sheets

DEVICE-TO-DEVICE RADIO FREQUENCY PROXIMITY DETERMINATION

RELATED APPLICATIONS

This present disclosure claims priority to U.S. Provisional Patent Application Ser. No. 62/411,896 filed Oct. 24, 2016, the disclosure of which is incorporated by reference herein in its entirety.

BACKGROUND

As mobile communication devices continue to expand in usage and importance throughout the world, the need for services that locate these devices also expands. Conventional location-based services include Global Positioning Satellites (GPS) and cellular multi-lateration or other cellular location protocols.

These conventional location-based services suffer with poor accuracy when a mobile communication device is indoors or otherwise obscured from a satellite or cellular tower. Further, these conventional services require substantial power consumption and high costs. In part to address these problems, some partial solutions have developed that use wireless access points for Wi-Fi networks that are present indoors or near a mobile device that is obscured from a tower or satellite. These partial solutions, however, fail in many situations, including where no access point exists, such as in many rural areas, or when security or access concerns limit their use. Even if an access point exits, the access point may be too far away from the mobile device for precision, or signal fluctuations may not permit adequate location determination.

SUMMARY

The present disclosure describes techniques and apparatuses for device-to-device radio frequency proximity determination. These techniques, in contrast to conventional cellular and GPS services, can accurately locate mobile devices at relatively low cost. In some aspects, three or more mobile communication devices communicate radio frequency ranging signals and, using information about these signals, a distance and direction between two of the devices is determined. In some other aspects, two mobile communication devices communicate radio frequency ranging signals separated in time, and after movement of one of the mobile communication devices. Using information about these two signals, a distance and direction between the two devices is determined.

In some aspects, a computer-implemented method is described that receives, at a first mobile communication device, information associated with a first RF ranging signal communicated between a second mobile communication device and a third mobile communication device, the second and third mobile communications devices remote from the first mobile communication device. The method then determines, based on information associated with the first RF ranging signal and second and third RF ranging signals communicated between the first mobile communication device and the second and third mobile communication devices, respectively, a first relative distance and direction between two of the first, second, and third mobile communication devices.

In other aspects, a mobile communication device is described that includes a transmitter, a receiver, and antennas to transmit or receive information about a radio frequency (RF) ranging signal, a processor, and one or more computer-readable storage media. The media have instructions that, responsive to execution by the processor, implement a ranging manager. The ranging manager is configured to perform operations comprising receiving, at the receiver, information associated with a first RF ranging signal communicated between a second mobile communication device and a third mobile communication device, the second and third mobile communications devices remote from the first-mentioned mobile communication device. The operations also include determining, based on information associated with the first RF ranging signal and second and third RF ranging signals communicated between the first mobile communication device and the second and third mobile communication devices, respectively, a first relative distance and direction between two of the first, second, and third mobile communication devices.

In yet other aspects, a computer-implemented method is described that communicates, between two mobile communication devices and at a first time, a first RF ranging signal, the RF ranging signal sufficient to determine a first relative distance between the mobile communication devices. The method also communicates, between the two mobile communication devices and at a second time, a second RF ranging signal, the second RF ranging signal sufficient to determine a second relative distance between the mobile communication devices. The method receives movement information indicating an amount of movement of one of the mobile communication devices between the first time and the second time. The method then determines a direction and distance between the mobile communication devices, the determining based on the first relative distance, the second relative distance, and the amount of movement.

This summary is provided to introduce subject matter that is further described in the Detailed Description and Drawings. Accordingly, this Summary should not be considered to describe essential features nor used to limit the scope of the claimed subject matter. The details of one or more implementations are set forth in the accompanying drawings and the following description. Other features and advantages will be apparent from the description and drawings, and from the claims.

BRIEF DESCRIPTION OF THE DRAWINGS

The details of one or more implementations of device-to-device radio frequency proximity determination are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Overview

Figure 1:
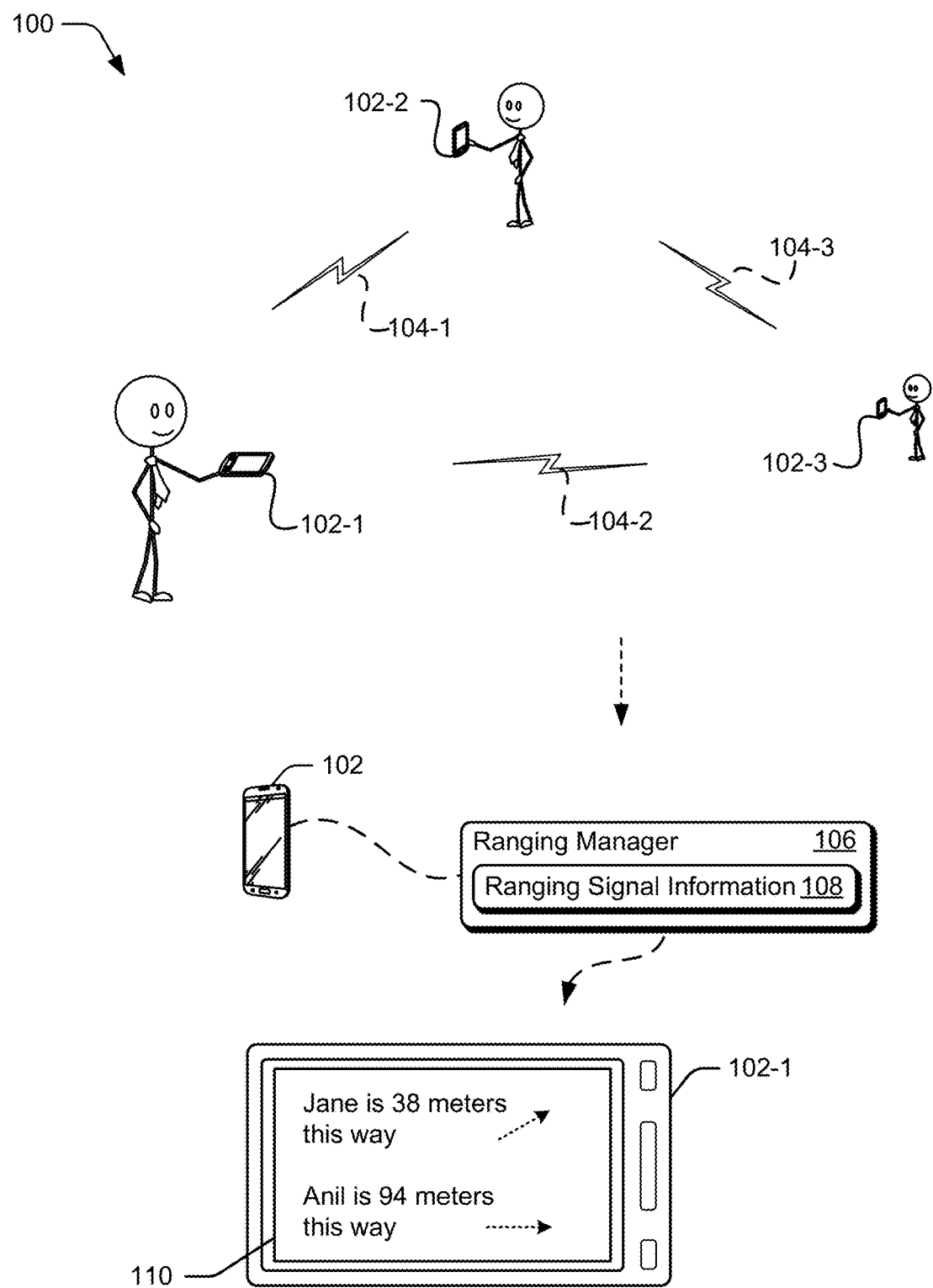
FIG. 1 illustrates an example operating environment having mobile communication devices and a ranging manager configured to perform device-to-device radio frequency proximity determination.

Conventional location services suffer from high costs and, in many common situations, poor accuracy. This document describes techniques for device-to-device radio frequency proximity determination ("device-to-device proximity determination"). These techniques, in contrast to conventional cellular and GPS services, can determine a proximity (e.g., a relative displacement and direction) of mobile devices at relatively low cost.

By way of example, consider some common situations in which a user wishes to locate another user or that user's device. Assume that Kim has a smart watch and a smartphone, and that she loses the smartphone in her house. Current techniques would use satellites or cellular towers, at high cost, to help Kim locate her smartphone. But even in the best-case scenario, these systems would struggle to tell Kim which room her lost device is in, never mind under which couch, in which school backpack, or in which coat pocket. In contrast, the device-to-device proximity determination techniques described herein enable Kim to find that lost device quickly, easily, and at low cost. She need only request that her smart watch perform these device-to-device proximity determination techniques to find her smartphone.

In more detail, Kim's smartphone can give her an estimate of how far away her smartphone is from her, and as she moves, tell her if she is getting closer or further away. After even a small movement of her smart watch, the techniques can display both the distance and direction to her smartphone. And, as Kim walks in the displayed direction, the techniques enable her smart watch to continue to provide immediate feedback. Thus, when she started to look for her smartphone, her watch may display: Your smartphone is 6.3 meters away. Then, after even minor movement, her watch can display: Your smartphone is 6.4 meters away, toward the Southwest. Alternatively, or in addition to, the interface can provide an arrow to her smartphone, similar to a compass needle. As Kim continues to walk, her interface is updated. Assume that after walking in the indicated direction for 6 meters, the display now reads: Your smartphone is 0.4 meters away, and is above you, (along with an arrow). Thus, she walks to closet, and even there, the smart watch provides additional detail, enabling Kim to find her smartphone in her purse on a shoulder-high shelf. This level of accuracy and resolution is simply not possible with conventional techniques, as well as being of lower cost. No cellular tower, access point, or orbiting satellite is needed.

In another example, assume three students are in a mall, and each wants to locate the other. The device-to-device techniques enable each student to find the other at low resource cost and high resolution. The techniques do so through use of radio frequency ranging from each device to each other device. With ranging information sent between each device and the others, all three can know the distance and direction to the other devices. Further, the direction and distance and be highly accurate, enabling each student to find the other even to resolutions smaller than one meter.

Further still, these techniques enable a user to learn and locate products and retain information about those products. Consider a user in a store looking for a particular product, such as Jose's Organic Orange Juice. Assume also that the grocery store is a smart store in which some products have an associated small communication device capable of radio frequency ranging. The user can find that orange juice in the store by finding its associated device, similar to finding the smailphone in the above example. And when found, additional information about Jose's Organic Orange Juice, a coupon for it, and so forth can be provided to the user's mobile device.

As a final example, the techniques enable a user to learn more about a product or service that the user has already located. Assume that John is walking down an aisle in a sporting goods store, and sees a selection of different tents for camping. With these techniques, he can simply move his phone near to a tent or point it in the direction of the tent, and receive information about that tent, such as reviews, detailed specifications, pricing and specials, and so forth. With the low cost of small ranging devices, many devices can be placed along the aisle, each providing information about its associated product.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having mobile communication devices 102, ranging signals 104 communicated between each two of the devices 102, and a ranging manager 106. The mobile communication devices 102 are capable of sending or receiving radio frequency (RF) ranging signals, such as those illustrated at 104-1, 104-2, and 104-3. The ranging manager 106 is capable of receiving information about the ranging signals 104 ("ranging signal information 108"). The ranging manager 106 can determine, based on the ranging signal information 108, a relative distance and direction between at least two of the mobile communication devices 102. Here the ranging manager 106 provides this determined distance and direction between the mobile communication device 102-1 and the mobile communication devices 102-2 and 102-3, respectively, as shown in a direction and distance user interface 110.

Figure 2:
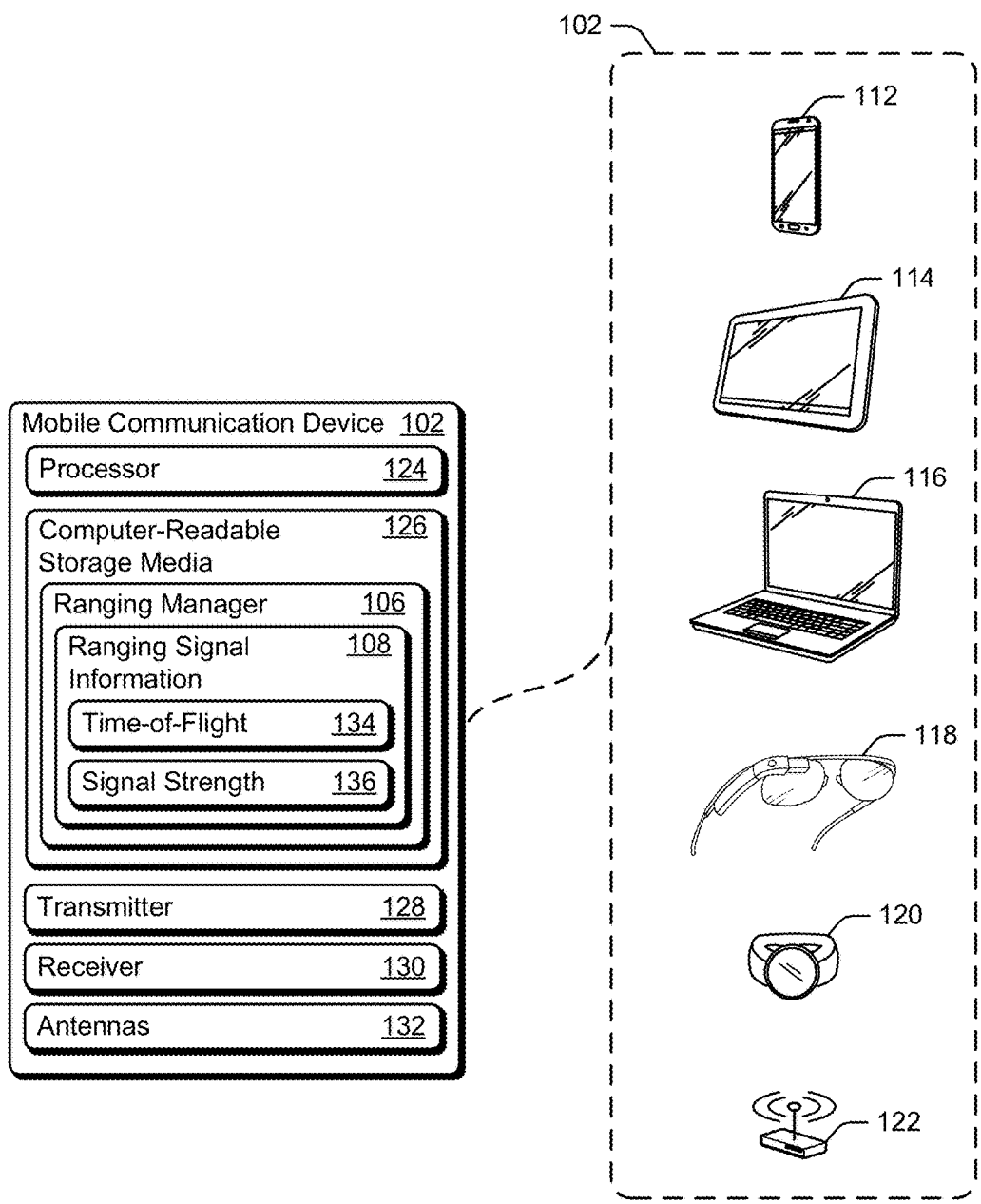
FIG. 2 illustrates example configurations of the devices of FIG. 1.

In more detail, consider FIG. 2, which illustrates examples of the mobile communication devices 102 of FIG. 1. The mobile communication device 102 can be any device that is capable of transmitting or receiving the ranging signal 104, such as a smartphone 112, a tablet computer 114, a laptop computer 116, computing spectacles 118, a smart watch 120, or an information-providing device 122. Although not shown, other configurations are also contemplated, such as a desktop computer, a server, a wearable smart-device, a television, a content-streaming device, a high-definition multimedia interface (HDMI) media stick, a mobile-internet device (MID), a network-attached-storage (NAS) drive, a mobile gaming console, and so on.

The mobile communication device 102 includes a processor 124 configured to execute processor-executable instructions and computer-readable storage media 126 (CRM 126). In some cases, the processor 124 is implemented as an application processor or baseband processor to manage operation and connectivity of the mobile communication device 102. The CRM 126 of the mobile communication device 102 may include any suitable type and/or combination of storage media, such as read-only memory (ROM), random access memory (RAM), or Flash memory. The CRM 126 may store firmware, an operating system, or applications of the mobile communication device 102 as instructions that are executed by the processor 124 to implement various functionalities of the mobile communication device 102. In this example, the CRM 126 includes the ranging manager 106 and the ranging signal information 108.

The mobile communication device 102 also includes a transmitter 128, receiver 130, and antennas 132 for communicating the ranging signals 104 and associated information. The transmitter 128 or receiver 130 may include any suitable number of respective communication paths (e.g., transmit or receive chains) to support transmission or reception of multiple spatial streams of data. Although not shown, radio frequency (RF) front-end circuitry of the mobile communication device 102 can couple or connect the transmitter 128 or receiver 130 to the antennas 132 to facilitate various types of wireless communication. The antennas 132 of the mobile communication device 102 may include an array of multiple antennas that are configured similar to or differently from each other.

In more detail, the ranging signals 104 can be WiFi signals having a frequency of 2 to 60 GHz, such as those conforming to IEEE 802.11 in the 2.4, 3.6, or 5 gigahertz band. These RF ranging signals can be a single radio hop communication, in contrast to a mobile ad hoc network. Further, these RF ranging signals can conform to a Wi-Fi Direct® standard or 802.11nc.

As noted in FIG. 1, the mobile communication device 102 is configured to receive information associated with an RF ranging signal communicated between other mobile communication devices, such as 102-2 and 102-3, with the ranging signal 104-3. Note that this ranging signal 104-3 was not communicated by the mobile communication device 102-1, but can be used by it to determine relative distance and direction. With this information, as well as information about the other ranging signals 104-1 and 104-2 (whether or not they were transmitted by the mobile communication device 102-1), the ranging manager 106 determines a relative distance and direction between itself and either of the other mobile communication devices.

In more detail, the ranging signal information 108 includes, or is usable to determine, a time-of-flight 134 or a signal strength 136, for the respective ranging signals 104. For the signal strength 136, the ranging manager 106 determines a relative distance and direction based on a determination of a signal strength of each of the ranging signals, or receives this information and uses it for a determination. Thus, for the example of FIG. 1, each, two, or all three of the mobile communication devices 102-1, 102-2, or 102-3 may determine the signal strength of the RF ranging signal, and thus a relative distance, or simply the signal strength for a later determination.

For the time-of-flight 134, the RF ranging signals include timing information, and the ranging manager 106 determines a relative distance and direction based on a determination of times-of-flight of each of the RF ranging signals, such as those of FIG. 1. Note that both of these manners may be used by the ranging manager 106, which can permit improved resolution of the relative displacement or direction.

The above environment and examples contemplate determination of relative distance and displace for three or more of the mobile communication devices 102. The techniques may determine a relative distance and direction through two mobile communication devices with two ranging signals, however.

Figure 3:
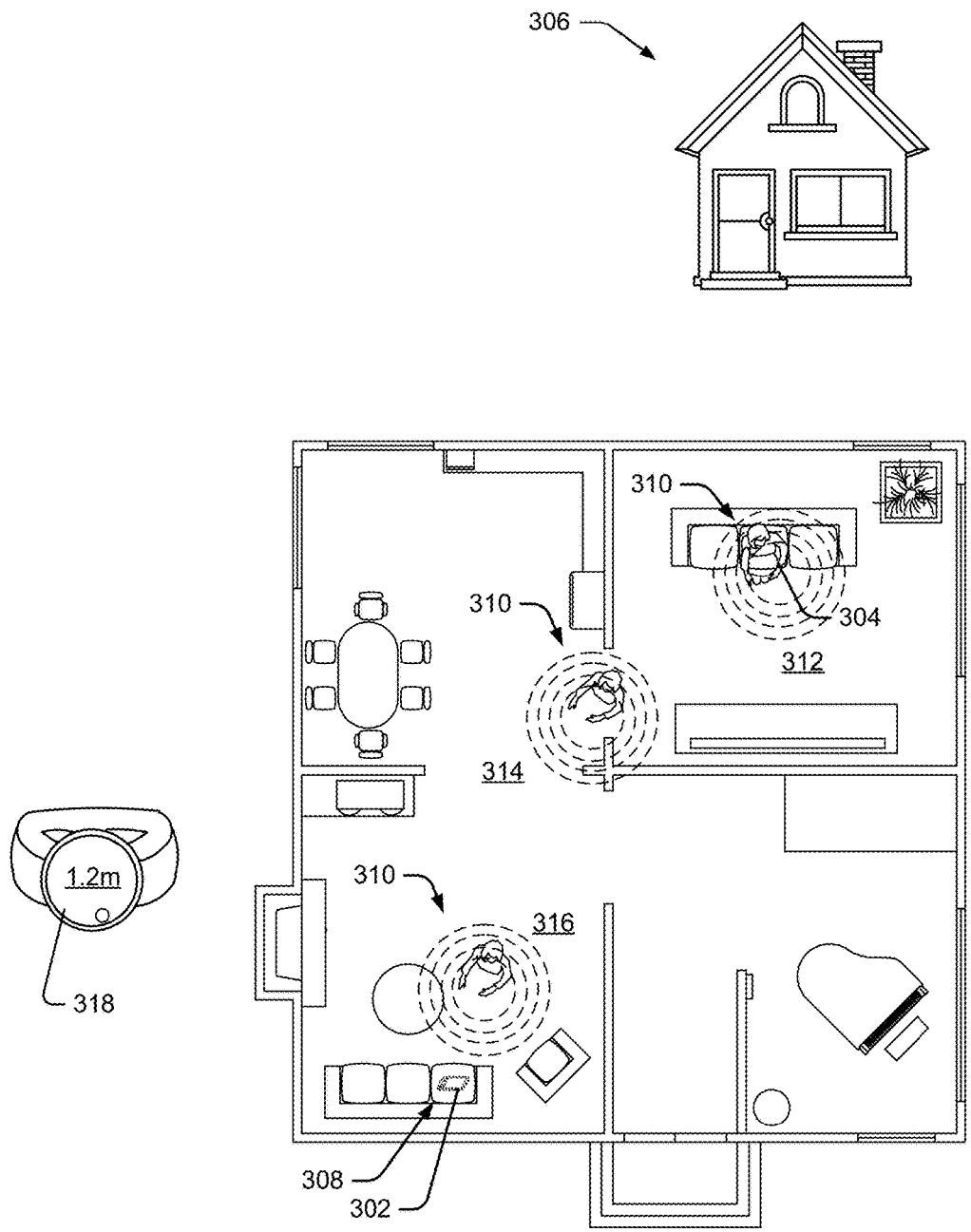
FIG. 3 illustrates two example mobile communication devices within a home.

Consider FIG. 3, for example, which illustrates two mobile communication devices 302 and 304, a smartphone and a smartwatch, within a home 306. Note that the smartphone is lost (but shown here under the cushion of a couch 308). The woman 310, while sitting in an entertainment room, decides that she wants her smartphone. She has forgotten where it is, however, and thus selects that her smartwatch find her smartphone. The ranging manager 106, operating on the smartwatch or the smartphone, is configured to provide the relative displacement and direction between the two devices.

In more detail, the ranging manager 106 is configured to transmit a first RF ranging signal 312 at a first time. As noted above, the RF ranging signal 312 is sufficient to determine a first relative distance between the mobile communication devices. The ranging manager 106 then transmits, at a second time, a second RF ranging signal 314. Here assume that the first ranging signal 312 and the second RF ranging signal 314 are separated in time and that one of the two devices has moved. Movement information is received by the ranging manager 106, such as from one of the device's sensors, which is sufficient to determine or approximate a distance or direction that mobile communication device 302 or 304 has moved. Here the woman 310 has walked from the entertainment room to a doorway into a kitchen. The ranging manager 106 continues to provide relative displacement and direction to her smartphone via her smartwatch, which is shown with her moving closer to the smartphone 302, until a third RF ranging signal 316 is transmitted, after which the woman 310 is informed that her smartphone is 1.2 meters away, at a particular direction pointing toward the cushion 308, and even that it is below wrist where the smartwatch resides. The ranging manager 106 uses the movement information and the amount of time that has passed between the transmissions, as well as changing in relative displacement, to continue to provide accurate direction to the woman 310. An example user interface 318 shows a relative distance and a directional dot, which are continually updated as the woman 310 moves.

Techniques for Device-to-Device RF Proximity Determination

The following discussion describes techniques for device-to-device radio frequency proximity determination. These techniques can be implemented using any of the environments and entities described herein, such as the ranging manager 106. These techniques include computer-implemented methods illustrated in FIGS. 4 and 6, each of which is shown as a set of operations performed by one or more entities. These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement ranging signals sent with and without use of post-movement ranging signals. In portions of the following discussion, reference will be made to operating environment 100 of FIG. 1 and entities of FIGS. 2 and 3 by way of example. Such reference is not to be taken as limiting described aspects to operating environment 100 but rather as illustrative of one of a variety of examples.

Figure 4:
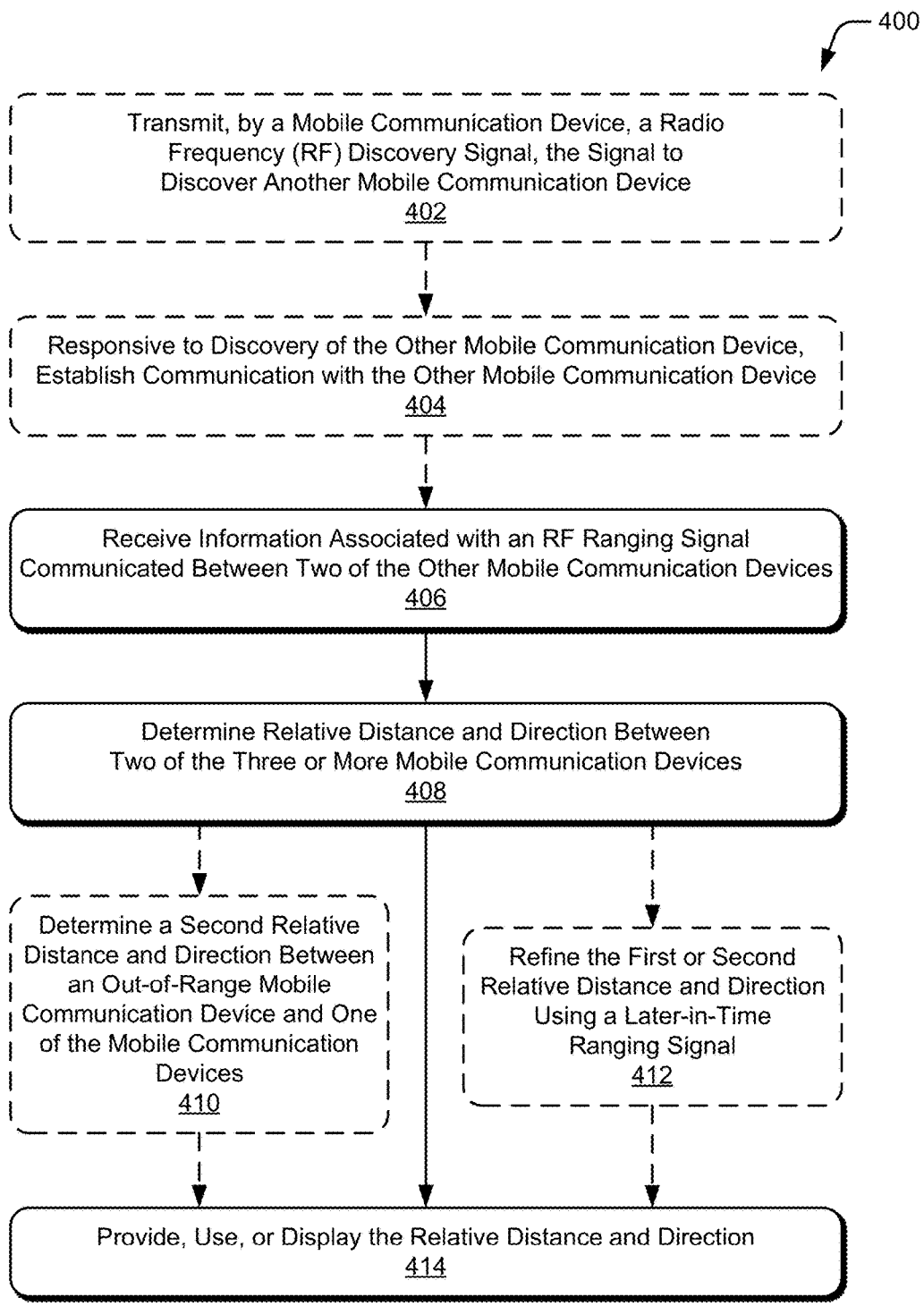
FIG. 4 illustrates an example method of device-to-device radio frequency proximity determination using three or more mobile communication devices.

FIG. 4 depicts an example computer-implemented method 400 for device-to-device radio frequency proximity determination using three or more mobile communication devices.

Optionally, at 402, one of the mobile communication devices transmits a radio frequency (RF) discovery signal. This RF discovery signal can be used to discover another mobile communications device and to determine, prior to transmission of a ranging signal, that the other device receiving the RF discovery signal is configured to perform device-to-device ranging. This is sometimes referred to as a handshake protocol.

Also optionally, at 404, and responsive to discovering the other mobile communication device using the RF discovery signal and prior to transmitting the RF ranging signal, communication is established with the other mobile communication device.

At 406, a first of the mobile communication devices receives information associated with an RF ranging signal communicated between two other mobile communication devices that are remote from the first mobile communication device. An example of this RF ranging signal is shown in FIG. 1, with the ranging signal 104-3 communicated between the mobile communication devices 102-2 and 102-3. While the ranging manager 106 does not need to transmit the ranging signals, but instead may receive information about those transmission, it may instead transmit them, other than the ranging signal between the other two mobile communication devices. Thus, optionally, the first of the mobile communication devices may transmit the ranging signals to the other mobile communication devices, and then receive back information about those ranging signals, such as signal strength or time-of-flight. By way of example, for this case assume that the mobile communication device 102-1 is the first of the mobile communication devices 102, and transmits the RF ranging signals 104-1 and 104-2 to the mobile communication devise 102-2 and 102-3, respectively.

At 408, a relative distance and direction between two of the three or more mobile communication devices is determined. This determination is based on information associated with the first RF ranging signal and the other RF ranging signals communicated between the first mobile communication device and the second and third mobile communication devices, respectively. As noted above, the ranging manager 106 may determine the relative distance using time-of-flight or signal strength of the RF ranging signals. In some cases both of these are used to further refine the accuracy, resolution, or robustness of the relative distance and the direction. Consider, for example, a case where the ranging manager 106 uses signal strength to determine that John is 94 meters from Anil. By also sending a ranging signal having time-of-flight from John's device to Anil's device, the distance can be confirmed or refined, such as to 93.4 meters.

At 410, a second relative distance and direction from a fourth mobile communication device that is out of range of an RF ranging signal to the first mobile communication device can be determined. The ranging manager 106 may do so by causing one of the other mobile communication devices to communicate a fourth RF ranging signal between the one of the other mobile communication devices and the out-of-range fourth mobile communication device and pass information about the fourth RF ranging signal to the first of the mobile communication devices. By so doing, the first or the fourth, or for that matter either of the other mobile communication devices, may determine the second relative distance and direction between the out-of-range fourth mobile communication device and any of the other three mobile communication devices, including the first mobile communication device, which is not in range of the fourth mobile communication device.

In more detail, the ranging manager 106 is capable of determining relative distance for each ranging signal between each of the mobile communication devices. With a relative distance between each of the three mobile communication devices, the direction between each can also be determined. To do so, the ranging manager 106 may use trilateration. In trilateration, a relative distance is determined using the geometry of circles (if two-dimensional), spheres (if three-dimensional), or triangles. With three points of reference and relative distances between each, direction, e.g., angles between each, may also be determined.

Optionally at 412, a resolution, accuracy, or robustness of the determined relative distance and direction are refined. This process is described both more generally and in more depth as part of computer-implemented method 600. Through an additional ranging signal sent after a known movement of one of the mobile communication devices, the direction or distance can be refined, such as be confirming either, averaging them with post-movement information for a more-robust measurement, or refining the accuracy, should the post-movement information be deemed more accurate.

At 414, the relative distance and direction is provided, used, or displayed. In the case of being displayed, the relative distance and direction can be given through units common to the device, such as meters, steps, yards, feet, and so forth, as well as directions a desired, such as a simple arrow or dot, an angle, or a text-based indicator (e.g., southwest, due north, east northeast). Any example of this is shown in FIG. 1 at the direction and distance user interface 110 and in FIG. 3 at the user interface 318.

Figure 5:
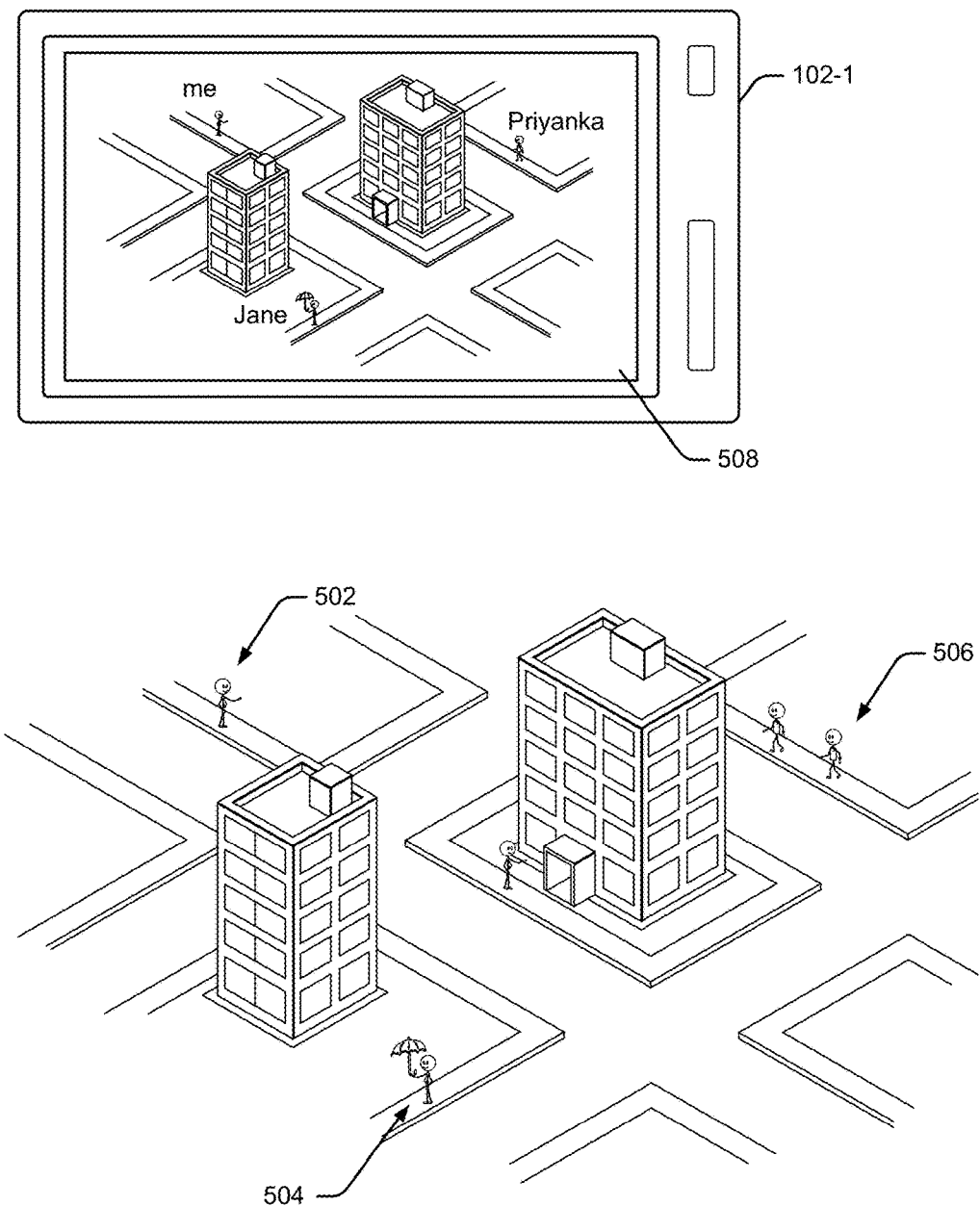
FIG. 5 illustrates three people having mobile communication devices outdoors that are able to locate each other using the techniques.

By way of example, consider FIG. 5, which illustrates three people that are outdoors in a city. Assume that these three people are coming from different directions, and are trying to meet up to go to lunch. The ranging manager 106, operating on the mobile communication device 102-1 of a first user 502, can determine that her friend, second user 504 (Jane, with the umbrella), and another friend, third user 506 (Priyanka), are in relation to her and in what direction. This can be shown in a mapping user interface 508, with locations on the map. To do so at least one actual, rather that relative, location is received, such as from another location service. This actual location, along with various mapping applications, can place each of these three users on the map (e.g., me, Jane, and Priyanka). This is one way to represent relative distances and directions between the three users, by placing them in a physical world with a map showing that physical world. This is not required, but is one way in which the methods may provide the relative distance and direction to cause these to be displayed.

Figure 6:
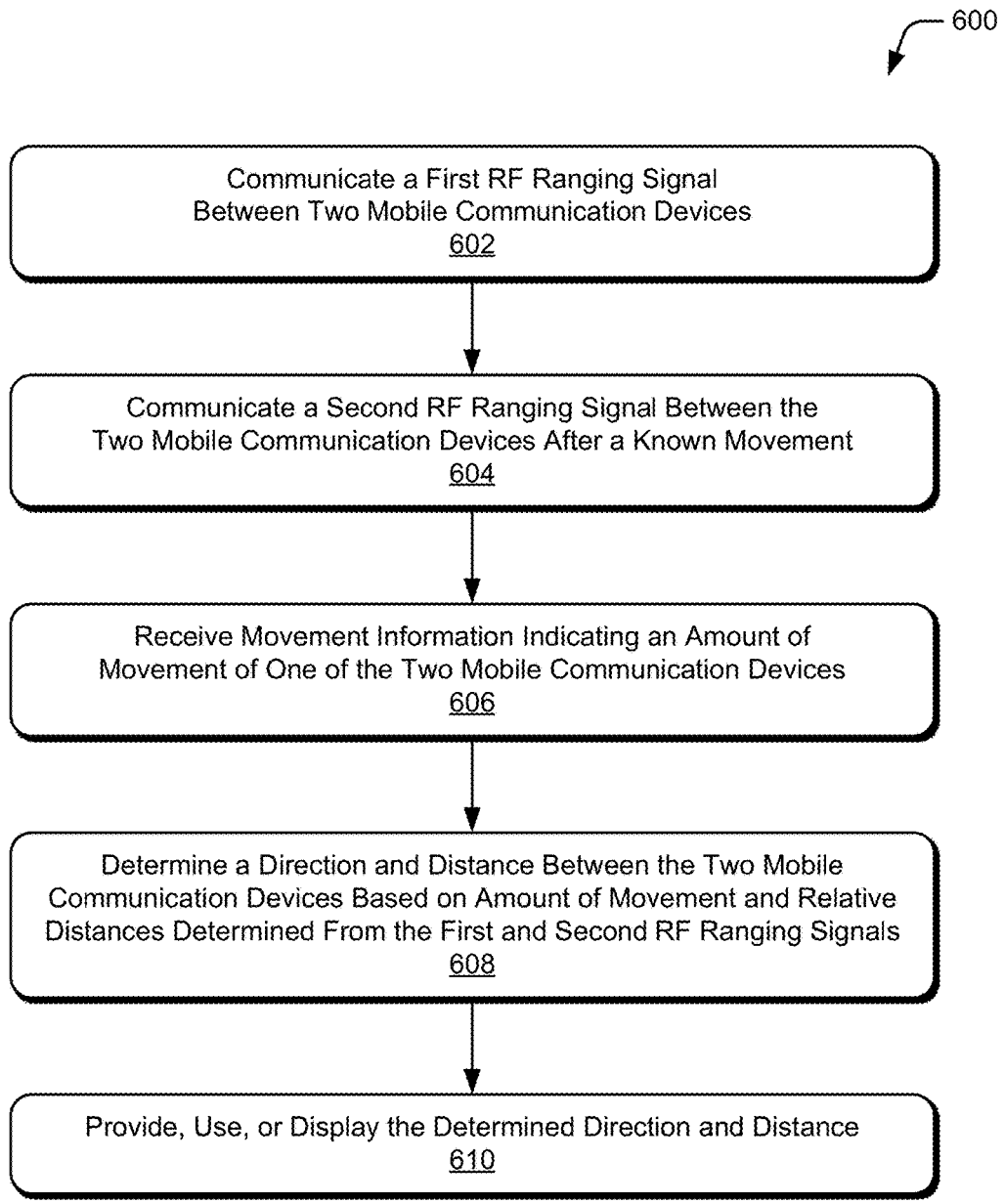
FIG. 6 depicts an example method of device-to-device radio frequency proximity determination using two mobile communication devices and a post-movement ranging signal.

FIG. 6 depicts an example computer-implemented method 600 for device-to-device radio frequency proximity determination using two mobile communication devices and a post-movement ranging signal.

At 602, a first RF ranging signal is communicated between two mobile communication devices and at a first time. Note that this can be performed after discovery, as optionally performed in method 400. The RF ranging signal is sufficient to determine a first relative distance between the mobile communication devices. This RF ranging signal can be any of those set forth above, and have a time stamp or other manner to determine time-of-flight, or rely on a signal strength determination, or both. For example, one of the mobile communication devices communicates the first RF ranging signal by transmitting the first RF ranging signal to a second mobile communication device and receives information, from the second mobile communication device. This information indicates a signal strength of the first RF ranging at reception, and this is sufficient to determine the first relative distance. Also or instead, one of the mobile communication devices communicates the first RF ranging signal by transmitting the first RF ranging signal to the second mobile communication devices and receives information, from the second mobile communication device, about a time-of-flight of the first RF ranging signal sufficient to determine the first relative distance.

At 604, a second RF ranging signal is communicated between the two mobile communication devices and at a second time and after a known movement of one of the two mobile communication devices. This second time allows for some period where, in many cases, the device transmitting the RF ranging signal will have moved some known or proximate amount.

At 606, movement information indicating an amount of movement of one of the mobile communication devices between the first time and the second time is received. Thus, if the user of the first mobile communication device moves 0.6 meters, this information can be used to determine a direction. The movement information can be through an accelerometer, compass, or in other manners, such as a step counter common to many mobile devices.

At 608, a direction and distance between the mobile communication devices is determined. This determination is based on the first relative distance, the second relative distance, and the amount of movement between when the first and second RF ranging signals were communicated (e.g., at the first and second times). The relative distance can be simply the second relative distance, but the difference between those distances and the amount of the movement are used to determine the direction.

As noted in part above, this determination of the direction and distance may include determining a difference in relative distance between the first relative distance and the second relative distance and, using this difference along with the amount of movement. For example, if the first relative distance is 4.0 meters, and the second is 5.2 meters, and the amount of movement is 1.7 meters, geometrically, the 1.7 meters is set as a hypotenuse and the 1.2 meters (5.2–4.0) as a height or base of the triangle having that hypotenuse. Thus, the ranging manager 106 can determine a direction, or in some cases, a range of directions, that over an additional iteration, refine that direction. As these ranging signals can be sent and analyzed quickly, the direction can also be quickly determined.

At 610, the determined direction and distance are provided, used, or displayed. The techniques permit a user to find another user, or a user to find, with one device, another of his or her devices. In some cases, however, the device being located can be an information-providing device or a device to simply find an associated item, such as one that is used to locate, or to describe, Jose's Organic Orange Juice. Thus, in the case of locating an item, the operation of 610 may receive, from the other mobile communication device, identity information associated with the other mobile communication device and present the identity information on a display associated with the user's mobile communication device, such as "Jose's Organic Orange Juice is on aisle 7, which is 9.3 meters from you, and a direction indicated by the arrow."

In the case of providing information, 610 may presents an advertisement, coupon, or product information associated with a product proximate the information-providing device (here is assumed to be a small communication device that may also be mobile). This information-providing device be small and even battery powered, as the resource requirements to receive a ranging signal and respond can be inexpensive and small in terms of cost, size, and bandwidth. Contrast this with the cost and size of many GPS or cellular capable devices, especially when those devices are attempting to operate within a building.

System-on-Chip

Figure 7:
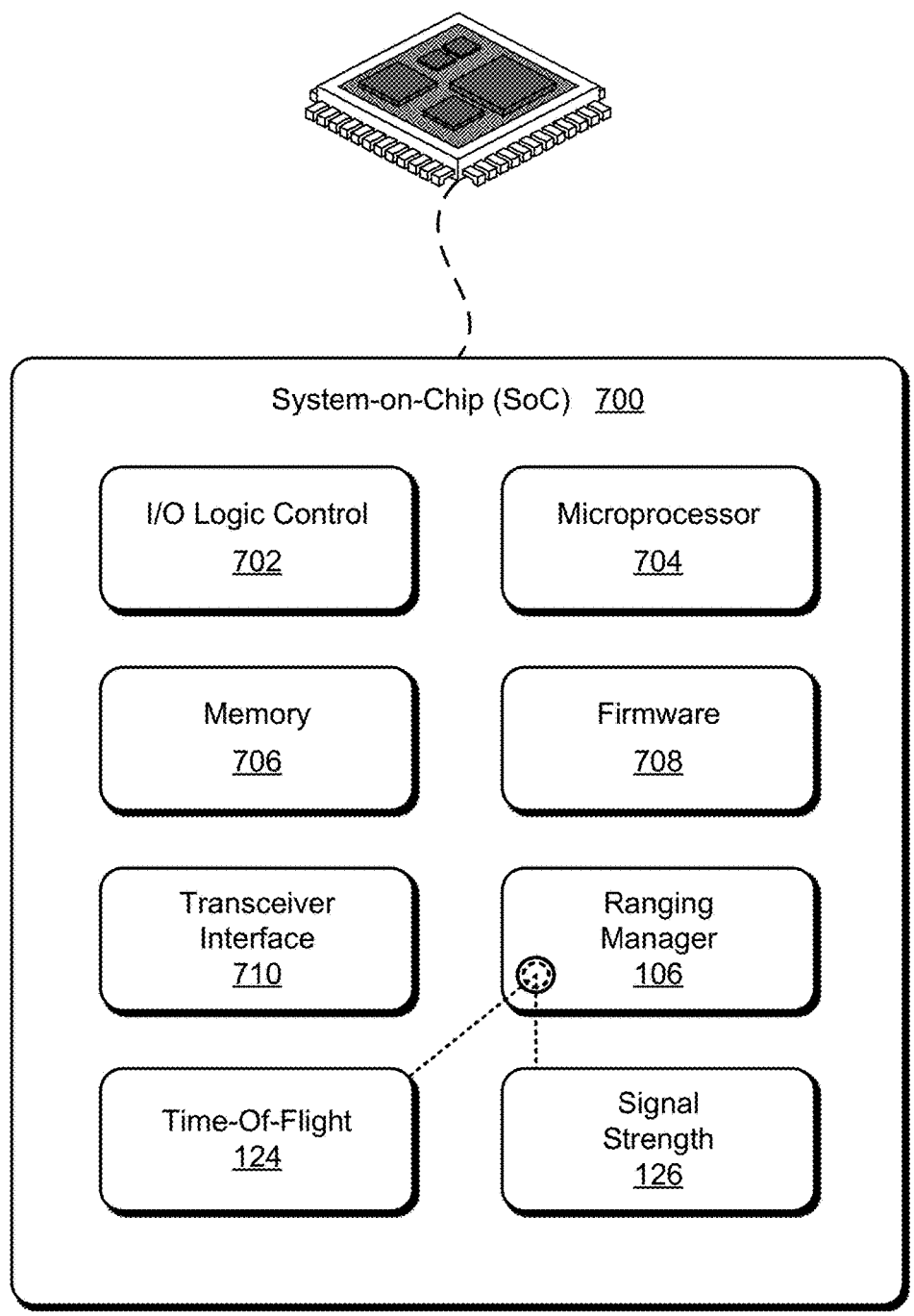
FIG. 7 illustrates an example System-on-Chip (SoC) environment for implementing aspects of device-to-device radio frequency proximity determination.

FIG. 7 illustrates an exemplary System-on-Chip (SoC) 700 that can implement various aspects of device-to-device radio frequency proximity determination. The SoC 700 can be implemented in any suitable device, such as a smart-phone, cellular phone, netbook, tablet computer, access point, wireless router, network-attached storage, camera, smart appliance, printer, a set-top box, or any other suitable type of device. Although described with reference to a SoC, the entities of FIG. 7 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 700 can be integrated with electronic circuitry, a microprocessor, memory, input-output (I/O) logic control, communication interfaces, other hardware, firmware, and/or software useful to provide functionalities of a device, such as any of the devices listed herein. The SoC 700 can also include an integrated data bus (not shown) that couples the various components of the SoC for data communication between the components. The integrated data bus or other components of the SoC 700 may be exposed or accessed through an external port, such as a JTAG port. For example, components the SoC 700 may be configured or programmed (e.g., flashed) through the external port at different stages of manufacture, provisioning, or deployment.

In this example, the SoC 700 includes various components such as input-output (I/O) logic control 702 (e.g., to include electronic circuitry) and a microprocessor 704 (e.g., any of a microcontroller, processor core, application processor, or DSP). The SoC 700 also includes memory 706, which can be any type and/or combination of RAM, SRAM, DRAM, non-volatile memory, ROM, one-time programmable (OTP) memory, multiple-time programmable (MTP) memory, Flash memory, and/or other suitable electronic data storage. In the context of this disclosure, the memory 706 stores data, instructions, or other information via non-transitory signals, and does not include carrier waves or other transitory signals.

Alternately or additionally, SoC 700 may comprise a data interface (not shown) for accessing additional or expandable off-chip memory, such as external SRAM or Flash memory. SoC 700 may also include various applications, operating systems, software, and/or firmware, which can be embodied as processor-executable instructions maintained by memory 706 and executed by microprocessor 704. In some cases, the SoC 700 includes other communication interfaces, such as a transceiver interface 710 for controlling or communicating with components of a local or off-chip wireless transceiver. In this example, the SoC 700 also includes the ranging manager 106, as described with reference to FIG. 1.

Examples of the ranging manager 106, as well as other components, and their corresponding functionality, are described with reference to the respective components of the environment 100 shown in FIG. 1 and example device configurations shown in FIG. 2. The ranging manager 106, either in whole or part, can be implemented as processor-executable instructions maintained by the memory 706 and executed by the microprocessor 704 to implement various aspects and/or features described herein. The ranging manager 106, along with the transmitter 128, the receiver 130, and the antennas 132, can operate independently or in combination with other entities and in any suitable combination of components or circuitry to implement aspects described herein. Alternately or additionally, the ranging manager 106 and other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A computer-implemented method comprising:
    receiving, at a first mobile communication device, first information associated with a first radio frequency (RF) ranging signal communicated between a second mobile communication device and a third mobile communication device, the second mobile communication device and the third mobile communication device remote from the first mobile communication device;
    determining, at the first mobile communication device, second information associated with a second RF ranging signal communicated between the first mobile communication device and the second mobile communication device;
    determining, at the first mobile communication device, third information associated with a third RF ranging signal communicated between the first mobile communication device and the third mobile communication device;
    determining, based on the first information, the second information, and the third information, a first relative distance and a first relative direction between the first mobile communication device and the second mobile communication device;
    receiving, at the first mobile communication device, fourth information associated with a fourth RF ranging signal between a fourth mobile communication device and the second mobile communication device, the fourth mobile communication device being out of a communication range of the first mobile communication device; and
    determining, based on the fourth information, the first relative distance, and the first relative direction, a second relative distance and a second relative direction between the first mobile communication device and the fourth mobile communication device.

2. The computer-implemented method as recited in claim 1, wherein the first RF ranging signal, the second RF ranging signal, the third RF ranging signal, and the fourth RF ranging signal are IEEE 802.11 signals having a frequency of 2 GHz to 60 GHz.

3. The computer-implemented method as recited in claim 1, wherein the first RF ranging signal, the second RF ranging signal, the third RF ranging signal, and the fourth RF ranging signal are single radio hop communications.

4. The computer-implemented method as recited in claim 1, wherein the first RF ranging signal, the second RF ranging signal, the third RF ranging signal, and the fourth RF ranging signal include timing information, and determining the first relative distance, the first relative direction, the second relative distance, and the second relative direction is based on a determination of respective times-of-flight of the first RF ranging signal, the second RF ranging signal, the third RF ranging signal, and the fourth RF ranging signal.

5. The computer-implemented method as recited in claim 1, wherein determining the first relative distance, the first relative direction, the second relative distance, and the second relative direction is based on a determination of respective signal strengths of the first RF ranging signal, the second RF ranging signal, the third RF ranging signal, and the fourth RF ranging signal.

6. The computer-implemented method as recited in claim 1, wherein determining the second relative distance and the second relative direction includes causing the second mobile communication device to communicate the fourth RF ranging signal to the fourth mobile communication device and cause the second mobile communication device to pass the fourth information to the first mobile communication device.

7. The computer-implemented method as recited in claim 1, further comprising, prior to receiving the first information, determining the second information, determining the third information, or receiving the fourth information, communicating a first RF discovery signal usable to discover the second mobile communication device and the third mobile communication device.

8. The computer-implemented method as recited in claim 1, further comprising displaying on a display associated with the first mobile communication device, the first relative distance, the first relative direction, the second relative distance, and the second relative direction.

9. A first mobile communication device, the first mobile communication device comprising:
    a transmitter, a receiver, and antennas to transmit or receive information about radio frequency (RF) ranging signals;
    a processor; and
    one or more computer-readable storage media having instructions that, responsive to execution by the processor, implement a ranging manager configured to perform operations comprising:
        receiving, at the receiver, first information associated with a first RF ranging signal communicated between a second mobile communication device and a third mobile communication device, the second mobile communication device and the third mobile communication device remote from the first mobile communication device;
        determining second information associated with a second RF ranging signal communicated between the first mobile communication device and the second mobile communication device;
        determining third information associated with a third RF ranging signal communicated between the first mobile communication device and the third mobile communication device;
        determining, based on the first information, the second information, and the third information, a first relative distance and a first relative direction between the first mobile communication device and the second mobile communication device;

receiving, at the receiver, fourth information associated with a fourth RF ranging signal between a fourth mobile communication device and the second mobile communication device, the fourth mobile communication device being out of a communication range of the first mobile communication device; and determining, based on the first relative distance, the first relative direction, and the fourth information, a second relative distance and a second relative direction between the first mobile communication device and the fourth communication device.

10. The first mobile communication device as recited in claim 9, wherein the second RF ranging signal and the third RF ranging are communicated as single radio hop communications by the transmitter at a frequency between 2 GHz and 60 GHz.

11. The first mobile communication device as recited in claim 9, wherein the first RF ranging signal, the second RF ranging signal, the third RF ranging signal, and the fourth RF ranging signal include timing information, and the determining the first relative distance, the first relative direction, the second relative distance, and the second relative direction is based on respective times-of-flight of the first RF ranging signal, the second RF ranging signal, the third RF ranging signal, and the fourth RF ranging signal.

12. The first mobile communication device as recited in claim 9, wherein the determining the first relative distance, the first relative direction, the second relative distance, and the second relative direction is based on respective signal strengths of the first RF ranging signal, the second RF ranging signal, the third RF ranging signal, and the fourth RF ranging signal.

13. The computer-implemented method as recited in claim 6, wherein determining the second relative distance and the second relative direction further includes causing the second mobile communication device to transmit a second RF discovery signal usable by the second mobile communication device to discover the fourth mobile communication device.

14. The first mobile communication device as recited in claim 9, wherein the operations further comprise, prior to receiving the first information, determining the second information, determining the third information, or receiving the fourth information, communicating a first RF discovery signal usable to discover the second mobile communication device and the third mobile communication device.

15. A computer-readable memory device comprising processor-executable instructions that, responsive to execution by a hardware-based processor, implement a ranging manager at a first mobile communication device configured to:

receive first information associated with a first radio frequency (RF) ranging signal communicated between a second mobile communication device and a third mobile communication device, the second mobile communication device and the third mobile communication device remote from the first mobile communication device;

determine second information associated with a second RF ranging signal communicated between the first mobile communication device and the second mobile communication device;

determine third information associated with a third RF ranging signal communicated between the first mobile communication device and the third mobile communication device;

determine, based on the first information, the second information, and the third information, a first relative distance and a first relative direction between the first mobile communication device and the second mobile communication device;

receive fourth information associated with a fourth RF ranging signal between a fourth mobile communication device and the second mobile communication device, the fourth mobile communication device being out of a communication range of the first mobile communication device; and determine the first relative distance, and the first relative direction, a second relative distance and a second relative direction between the first mobile communication device and the fourth mobile communication device.

16. The computer-readable memory device as recited in claim 15, wherein the first RF ranging signal, the second RF ranging signal, the third RF ranging signal, and the fourth RF ranging signal are IEEE 802.11 signals having a frequency of 2 GHz to 60 GHz.

17. The computer-readable memory device as recited in claim 15, wherein the first RF ranging signal, the second RF ranging signal, the third RF ranging signal, and the fourth RF ranging signal are single radio hop communications.

18. The computer-readable memory device as recited in claim 15, wherein the first RF ranging signal, the second RF ranging signal, the third RF ranging signal, and the fourth RF ranging signal include timing information, and determining the first relative distance, the first relative direction, the second relative distance, and the second relative direction is based on a determination of respective times-of-flight of the first RF ranging signal, the second RF ranging signal, the third RF ranging signal, and the fourth RF ranging signal.

19. The computer-readable memory device as recited in claim 15, wherein determining the first relative distance, the first relative direction, the second relative distance, and the second relative direction is based on a determination of respective signal strengths of the first RF ranging signal, the second RF ranging signal, the third RF ranging signal, and the fourth RF ranging signal.

20. The computer-readable memory device as recited in claim 15, wherein the ranging manager is further configured to, prior to receiving the first information, determining the second information, determining the third information, or receiving the fourth information, communicate a first RF discovery signal usable to discover the second mobile communication device and the third mobile communication device.

* * * * *